E. H. Penfield.
Metallic Grommet.

Nº 5,779.   Patented Sept. 19, 1848.

UNITED STATES PATENT OFFICE.

E. H. PENFIELD, OF MIDDLETOWN, CONNECTICUT.

METALLIC GROMET.

Specification of Letters Patent No. 5,779, dated September 19, 1848.

*To all whom it may concern:*

Be it known that I, ELDRIDGE H. PENFIELD, of Middletown, in the county of Middlesex and State of Connecticut, have invented a new and Improved Gromet, of which the following is an exact description.

The nature of my invention consists in making a gromet with an inside and outside lock. This I do by making it of two ferrules having a rim turned upon one edge about half an inch broad. One of said ferrules is made with teeth, instead of a cylindrical socket, just large enough to slip over the inside ferrule, which is left smooth on its edges, as a common cylindrical socket. After cutting a hole in the sail just large enough to receive the gromet the outside one or one having teeth is put through the hole, the inside one or one with a smooth edge is then put through, and a conical pin is then drove through which turns the teeth of the outside one into the cloth and the edge of the inside one firmly onto the rim of the outside one, thereby firmly fixing it.

There are many advantages that might be pointed out in using this gromet well known to ship builders and sailors. First they will always keep their place, as the teeth becoming fixed in the sail will never allow them to move or allow the cloth to be drawn out from between the flanches by any strain on the sail. Second, being composed of brass the sail cannot contract around them in damp weather so as to prevent the free use of the cords and third, they are cheaper than any other hole can be made for the purpose.

To enable others skilled in the art to make and use my invention, I will proceed to describe it with reference to the annexed drawings making a part of this specification.

Figure 1:
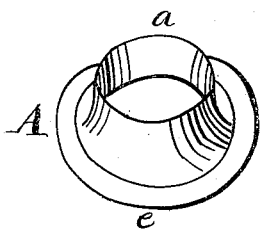
Figure 2:
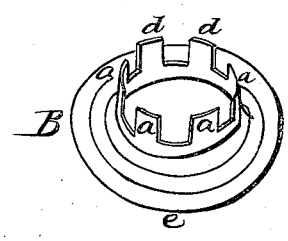

A B, Figures 1 and 2, show both parts of my gromet in perspective.

*a, a,* &c., Fig. 2, represent the teeth on the outside ferrule.

*a*, Fig. 1, represents the inside ferrule and *e, e,* Figs. 1 and 2, represent the rims on said ferrule, said rims are about half an inch wide and made solid on the ferrules. I make them of brass and raise them in a die suitable for that purpose, the width of the ferrule in all cases must correspond with the thickness of the sail, thereby preventing any motion of the gromet in the sail, and preventing the sail from drawing out, sidewise, from the gromet, and thereby tearing the cloth and loosening the gromet.

I am aware that gromets have been made of a socket with a flanch raised on one of its ends, and a washer put on the other end, after passing the socket through the cloth; when, by setting down the end of the socket over the washer, it holds the cloth between to smooth edged flanches, which will however allow the cloth to be drawn out whenever there shall be great strain on it; therefore, I do not claim the socket or washer, as such, nor the manner of locking them together, as my invention, but What I do claim as my invention, and desire to secure by Letters Patent, is—

Making a gromet of a metallic cylindrical tube, or ferrule, having a solid disk, or rim on one edge, (as seen in Fig. 1,) and a similar shaped solid disk with a ferrule, made with teeth, or points, (as seen in Fig. 2,) which two together, pass through the cloth and lock in such a manner that the teeth, or points, *a, a,* &c., Fig. 2, may turn over and press upon the cloth, to prevent its being strained out, and torn or injured, by the strain on the sail, the whole constructed, and attached substantially, as herein described.

In testimony whereof I the said E. H. PENFIELD subscribe my name in presence of the witnesses whose names are hereto subscribed.

ELDRIDGE H. PENFIELD.

Witnesses:
JAMES SPENCER,
M. G. SMITH.